United States Patent [19]

Erculiani

[11] 3,878,485

[45] Apr. 15, 1975

[54] TRANSMISSION LINE FOR TDM COMMUNICATION SYSTEM

[75] Inventor: Paolo Erculiani, Milan, Italy

[73] Assignee: Societa Italiana Telecommunicazioni Siemens S.p.A., Milan, Italy

[22] Filed: June 13, 1973

[21] Appl. No.: 369,731

[30] Foreign Application Priority Data

June 15, 1972 Italy .................................. 25734/72
June 15, 1972 Italy .................................. 25735/72
June 15, 1972 Italy .................................. 25733/72

[52] U.S. Cl. .................. 333/6; 179/15 AN; 333/12; 333/24 R; 333/84 M; 333/96

[51] Int. Cl. .......................... H04h 3/10; H04b 3/28

[58] Field of Search ........... 333/96, 12, 84 M, 6, 24; 179/15 AN

[56] References Cited

UNITED STATES PATENTS

| | | | |
|---|---|---|---|
| 801,130 | 10/1905 | Barclay | 333/12 |
| 2,052,317 | 8/1936 | Schelkunoff | 333/96 |
| 2,462,887 | 3/1949 | Muller | 333/96 |
| 2,797,392 | 6/1957 | Clogston | 333/96 |
| 2,942,211 | 6/1960 | Raisbeck | 333/96 |
| 3,002,164 | 9/1961 | Wilson | 333/84 M |
| 3,135,935 | 6/1964 | Enbelbrecht | 333/84 M |
| 3,416,102 | 12/1968 | Hamlin | 333/96 |
| 3,740,678 | 6/1913 | Hill | 333/84 M |

OTHER PUBLICATIONS

Andrew, Advertisement from Andrew Corp., 10500 W. 153 St., Orland Park, Ill., "Heliax Coaxial Cable."

Terman, F. E. "Radio Engineers Handbook," McGraw Hill, 1943, pp. 37.

Schelkunoff, S. A. et al., "Crosstalk Between Coaxial Transmission Lines," Bell Sys. Tech. Jr., Vol. 16, 1937, pp. 144–164.

Schelkunoff, S. A., "The Electromag. Theory of Coaxial Transmission Lines and Cylindrical Shields," Bell Sys. Tech. Jr., Vol. 13, 1934, pp. 532–534, 543–575.

*Primary Examiner*—Alfred E. Smith
*Assistant Examiner*—Wm. H. Punter
*Attorney, Agent, or Firm*—Karl F. Ross; Herbert Dubno

[57] ABSTRACT

In order to suppress cross-talk between channels using adjoining time slots in a time-division-multiplex (TDM) communication system, the message signals are carried by a transmission line with two conductors, of a maximum effective thickness on the order of magnitude of the penetration depth δ of the current, separated by a layer of a substantially nonpolarizable dielectric material such as polyethylene or Teflon. The conductors may be parallel strips or coaxial; in the latter case, either or both could be a solid foil of the specified thickness or could be composed of one or more litz wires whose strands have that thickness.

7 Claims, 11 Drawing Figures

TRANSMISSION LINE FOR TDM COMMUNICATION SYSTEM

1. FIELD OF THE INVENTION

My present invention relates to a transmission line for a telecommunication system of the time-division-multiplex (TDM) type in which message signals from a plurality of channels are simultaneously transmitted, in the form of interleaved voltage samples, in respective time slots of a cycle.

2. BACKGROUND OF THE INVENTION

In such a system it is customary to separate the several time slots in a cycle by so-called guard intervals designed to allow the decay of a previous voltage sample to substantially zero before the next sample is transmitted, in order to avoid cross-talk between adjoining channels. The decay time is a function of parasitic line impedances which heretofore required relatively complex compensating circuitry in order to minimize cross-talk with reasonably short guard intervals.

3. OBJECTS OF THE INVENTION

The general object of my present invention is to provide an improved transmission line for the purpose set forth which obviates the need for such compensating circuitry while suppressing all objectionable cross-talk.

A more specific object is to provide a transmission line of this character which can be easily connected to any number of branch circuits.

4. SUMMARY OF THE INVENTION

In accordance with my present invention, a transmission line for a TDM system comprises elongate, mutually juxtaposed first and second conductor means separated by an insulating layer of a substantially nonpolarizable dielectric material, thereby avoiding the prolonged storage of residual parasitic voltages in the insulation. Furthermore, the effective thickness of each conductor means (as measured in a common plane transverse to the insulating layer) should at most be on the order of magnitude of the penetration depth ($\delta$) of an alternating current at the frequency of the transmitted signal, this frequency generally lying in the KHz range.

A substantially nonpolarizable dielectric material is essentially a polymer free from large polar submolecular groupings, i.e. a polymer whose repetitive groups do not have termini of significantly different electronegativity. Such polymers, of which polyethylene and polytetrafluoroethylene (Teflon) are representative examples, generally have a linear carbon chain with simple single-double bonds. The thickness of that dielectric layer is not critical but should be large compared to the effective thickness of the adjoining conductor means separated thereby.

The invention may be realized with strip lines as well as with coaxial lines. In the case of a strip line, the first conductor means comprises an inner strip whereas the second conductor means forms a pair of outer strips, preferably of greater width and interconnected at longitudinally spaced locations, bracketing the inner strip. In the case of a coaxial line the first conductor means is an inner conductor and the second conductor means is a tubular outer conductor; either of these conductors may be a solid foil, as in the case of a strip line, or could be constituted by a litz wire (or by a tubular array of such litz wires for the outer conductor) whose effective thickness is the diameter of each individual strand thereof.

The penetration depth $\delta$ is given by $$\delta = \sqrt{\frac{2}{\omega\mu\sigma}} \qquad (1)$$

where $\omega = 2\pi f$ is the pulsatance of the signal voltages, $\mu$ is the magnetic permeability of the conductor material (e.g. copper) and $\sigma$ is its conductivity. In TDM telephone systems of the type using resonant transfer with f = 0.6 MHz, the penetration depth $\delta$ in the case of copper conductors is about 0.09 mm; thus, the effective thickness of a conductor in a transmission line according to my invention should then be less than 0.1 mm.

5. BRIEF DESCRIPTION OF THE DRAWING

The above and other features of my invention will now be described in detail with reference to the accompanying drawing in which.

6. SPECIFIC DESCRIPTION

Figure 1A:
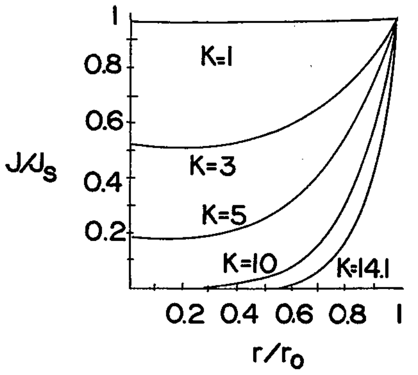
FIG. 1A is a graph showing the variation of current density throughout the cross-section of a cylindrical conductor.

Reference will first be made to FIG. 1A in which I have plotted the relative current density $J/J_s$ against the radial distance $r/r_0$ in a conductor of circular cross-section for different parameters K, with $r_0$ the radius of the conductor, $J_s$ the current density at the surface (i.e. at radius $r_0$) and J the current density at a point spaced from the conductor axis by the distance $r \leq r_0$. The parameter K is defined in terms of $\delta$ by the expression $$k = \frac{r_0\sqrt{2}}{\delta} \qquad (2)$$

Since the penetration depth $\delta$ varies inversely with K, as per equation (2), the relative current density is nearly uniform throughout the cross-section of the conductor for $K = 1$ and is near zero in the interior of the conductor for $K >> 1$; this phenomenon is known as the skin effect and, according to equation (1), is significant only at elevated frequencies.

Figure 1B:
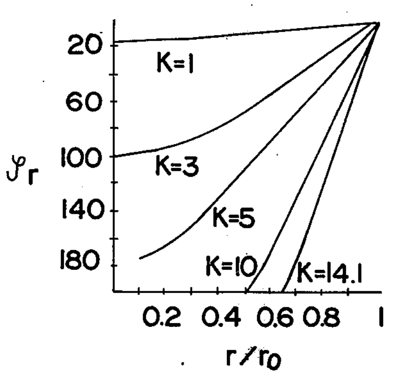
FIG. 1B is a similar graph illustrating the phase shift of the current throughout the cross-section.

As shown in FIG. 1B, the phase shift $\phi_r$ of the current of an internal point (at distance $r$ from the axis) with reference to the surface current is small throughout the conductor for $K \approx 1$ but increases sharply for $K >> 1$.

Figure 2:
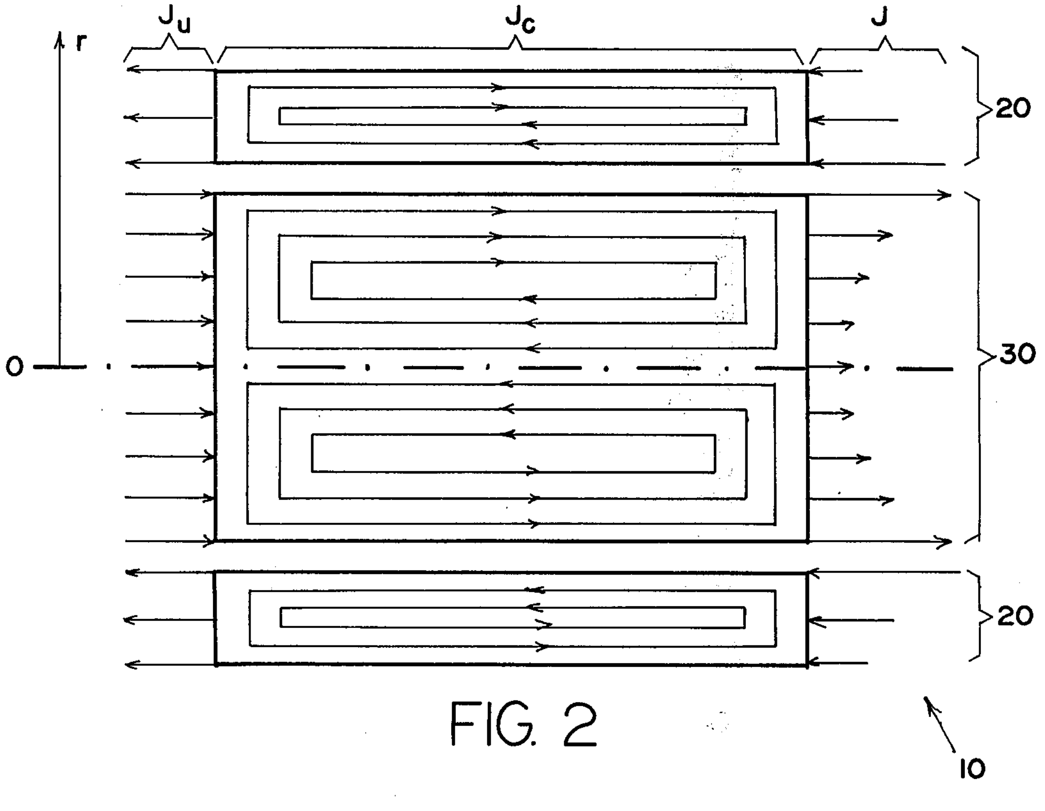
FIG. 2 is a diagram of the current distribution in a coaxial line.

FIG. 2 diagrammatically shows the distribution of the current flow in an axial section of a coaxial line 10 comprising an outer conductor 20 and an inner conductor 30 centered on an axis O. The density of the signal current, assumed to be uniform throughout the cross-section of each conductor, has been designated $J_a$ whereas the density of the circulating or eddy currents within the conductor has been shown at $J_c$. The overall current density J is the algebraic sum of current densities $J_a$ and $J_c$, varying for each conductor from a maximum value at its surface confronting the other conductor to a minimum value at the point farthest from that surface, in the manner illustrated in FIG. 1A.

Figure 3:
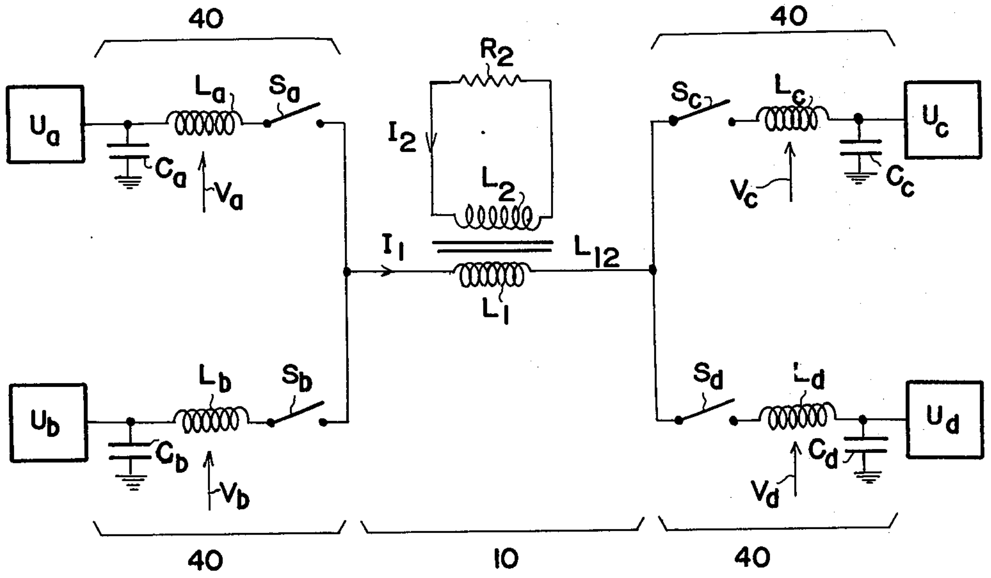
FIG. 3 is a diagram of an equivalent circuit of a transmission line interconnecting a number of subscriber stages.

The equivalent circuit of such a coaxial line 10, used as a transmission link between a number of telephone subscribers $U_a$, $U_b$, $U_c$, $U_d$, has been shown in FIG. 3 as comprising a series inductance $L_1$ magnetically coupled at $L_{12}$ to a parasitic inductance $L_2$ in series with a parasitic resistance $R_2$. The signal current of resonant-transfer frequency $f$ is shown at $I_1$; the eddy current circulating through the parasitic impedances $L_2$ and $R_2$ has been designated $I_2$. The series inductances and shunt capacitances of the various feeder lines 40 associated with the subscribers $U_a$ and $U_d$ have been designated $L_a$–$L_d$ and $C_a$–$C_d$.

Let us assume that subscriber $U_a$ converses with subscriber $U_c$ in one time slot (closure of gating switches $S_a$ and $S_c$) whereas subscriber $U_b$ talks to subscriber $U_d$ in the immediately following time slot (closure of gating switches $S_b$ and $S_d$). The charges stored in the latter time slot on capacitors $C_b$ and $C_d$ are affected by the parasitic current $I_2$ still circulating in the line from the preceding signal transmission between subscribers $U_a$ and $U_c$.

With $L_a = L_b = L_c = L_d = L$ and $C_a = C_b = C_c = C_d = C$ the relationship between the signal voltage $V_s$ (e.g. as developed across capacitor $C_a$) and a cross-talk voltage $V_x$ (e.g. as developed across capacitor $C_b$) is given by the formula $$\frac{V_x}{V_s} \approx \frac{L_{12}^2}{4L^* \cdot L_2} \cdot \frac{\omega^2\alpha^2}{(\alpha^2+\omega^2)^2}(1+e^{-\alpha\tau})^2 e^{-\alpha\Delta t} \qquad (3)$$

where $L^* = L + L_1/2$ is half the inductance of the resonant circuit, $\omega = (1)/\sqrt{L^*C}$ is the pulsatance of the resonant transfer, $\alpha = (R_2)/L_2$ is the power factor of the parasitic circuit, $\tau = \pi\sqrt{L^*C}$ is the half-period of the resonant wave, and $\Delta t$ is the guard interval.

Empirical data, obtained from tests I have made with a transmission line of conventional construction, have confirmed equation (3) with a high degree of approximation. I have also established, in conformity with this equation and the conducted experiments, that the cross-talk voltages developed at opposite ends of the line (e.g. across capacitors $C_b$ and $C_d$) are of opposite sign.

If, in accordance with the present invention, the effective thickness of the conductors of transmission line 10 is substantially equal to or less than the penetration depth $\delta$, its current distribution is nearly uniform so that the density $J_c$ (FIG. 2) of the parasitic circulating currents $I_2$ is insignificant; this corresponds, in turn, to a very low coupling factor $L_{12}$ and, accordingly, to a very small ratio $V_x/V_s$.

However, this separation of the cross-talk component $V_x$ takes into account only the electrical phenomena within the conductor and ignores the storage of energy in the associated dielectric. My tests have shown that even after a guard interval sufficient to discharge the nominal line capacitance there still remains a residual voltage component which can be traced to the presence, within the dielectric, of polar groups that orient themselves in response to the applied electric field. Upon the disappearance of that field, these groups return to their random position under the control of internal forces unaffected by outside influences. This behavior may be considered a hysteresis phenomenon individual to the insulating material employed.

Figure 4:
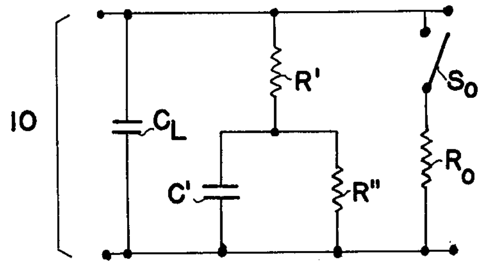
FIG. 4 is a diagram of an equivalent circuit of the insulation associated with the transmission line of FIG. 1.

FIG. 4 diagrammatically illustrates the equivalent circuit of a dielectric exhibiting such hysteresis. The circuit includes a resistance $R'$ in series with the parallel combination of a capacitance $C'$ and a resistance $R''$, the network $C'$, $R'$, $R''$ lying in shunt with the line capacitance $C_L$ and the grounding resistance $R_o$ effective upon closure of a gating switch $S_o$ during the guard interval $\Delta t$. The magnitudes of impedances $C'$, $R'$, $R''$ can be determined empirically.

With $C'R_o << \Delta t$, my tests of a conventional transmission line have shown that $C'(R' + R_o) >> \Delta t$ and $C'R'' > \Delta t$. Thus, the term $C'R''$ is a measure of the time constant for the spontaneous depolarization of the dielectric. This time constant is a minimum if the dielectric material is a polymer of the type defined above which may therefore be described as substantially nonpolarizable.

Figure 5:
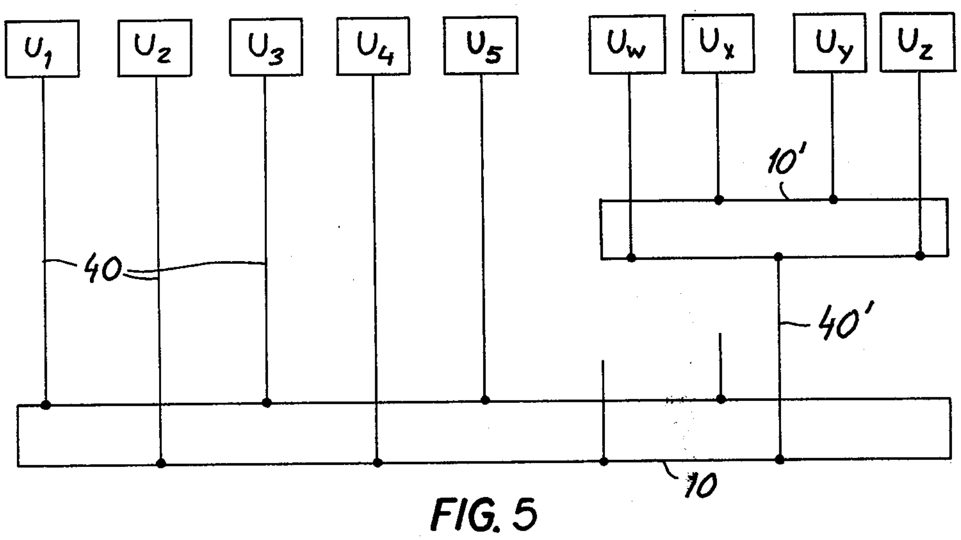
FIG. 5 is a diagrammatic view of a telecommunication system embodying such a transmission line.

FIG. 5 shows the transmission line 10 closed into a loop serving a multiplicity of subscribers $U_1$, $U_2$, $U_3$, $U_4$, $U_5$, . . . $U_w$, $U_x$, $U_y$, $U_z$. Subscribers $U_1$–$U_5$ have their branch lines 40 directly connected to main line 10 whereas subscribers $U_w$–$U_z$ reach that line through an ancillary, similar line loop 10' and a branch 40'. Any subscriber along the main loop 10 communicates with any other subscriber along that loop, or with the ancillary loop 10', via two parallel paths which are generally of unequal length, the current density being higher along the shorter path. With approximate uniform spacing of the several junctions along either loop, the path carrying the larger signal currents will have fewer discontinuities due to such junctions with resulting further reduction in the level of cross-talk.

I shall now describe, with reference to FIGS. 6–10, several specific embodiments of a transmission line according to my invention, any of which may be used in the system of FIG. 5.

Figure 6:
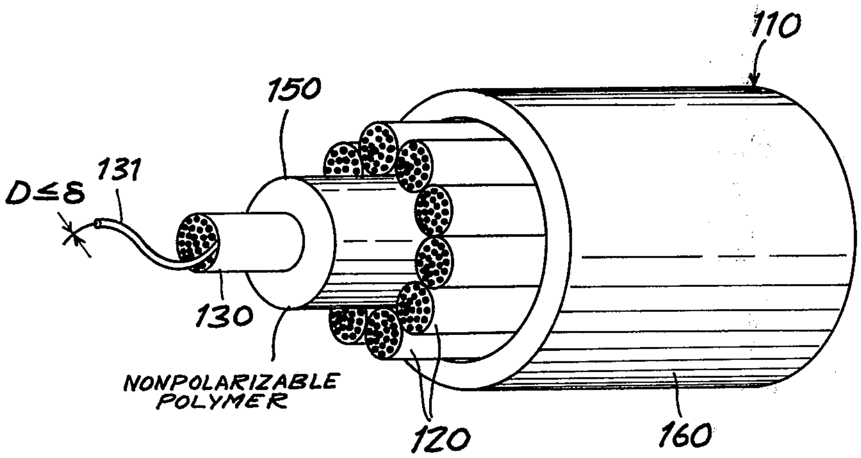
FIG. 6 is a perspective view of a portion of a transmission line embodying my invention.

In FIG. 6 I have shown a coaxial line 110 comprising an outer conductor 120, an inner conductor 130, an intervening insulation 150 and an external sheath 160. Conductor 130 consists of a single litz wire whose strands 131, which are uniformly intertwined, consist of individually insulated copper cores with a diameter $D \leq \delta$, this diameter D representing the effective thickness of the conductor perpendicular to the dielectric layer 150. Outer conductor 120 consists of a tubular array of litz wires similar to the one constituting the central conductor 130.

Layer 150 consists of a substantially nonpolarizable polymeric material of the aforedescribed type, such as polyethylene of Teflon, to minimize cross-talk in accordance with my present invention. The outer sheath 160 may consist of similar material but, since it does not lie in the high-frequency field, could also be made from a different dielectric conventionally used for this purpose.

At locations where branch lines are to be joined to main line 110, leads of these branch lines penetrate the insulation 150, 160 for connection to the respective litz wires. These connections, which bridge the individual strands of the litz wire, locally increase the effective thickness of conductors 120 and 130; with the loop system shown in FIG. 5, however, the effect of such increase upon the coupling between the several signal channels is minimal.

In a specific example, inner conductor 130 was a litz wire of 180 strands of diameter D = 0.04 mm and a pitch of approximately 12 mm; the litz wires of outer conductor 120 consisted of 135 strands each, of similar thickness and pitch.

Figures 7, 8:
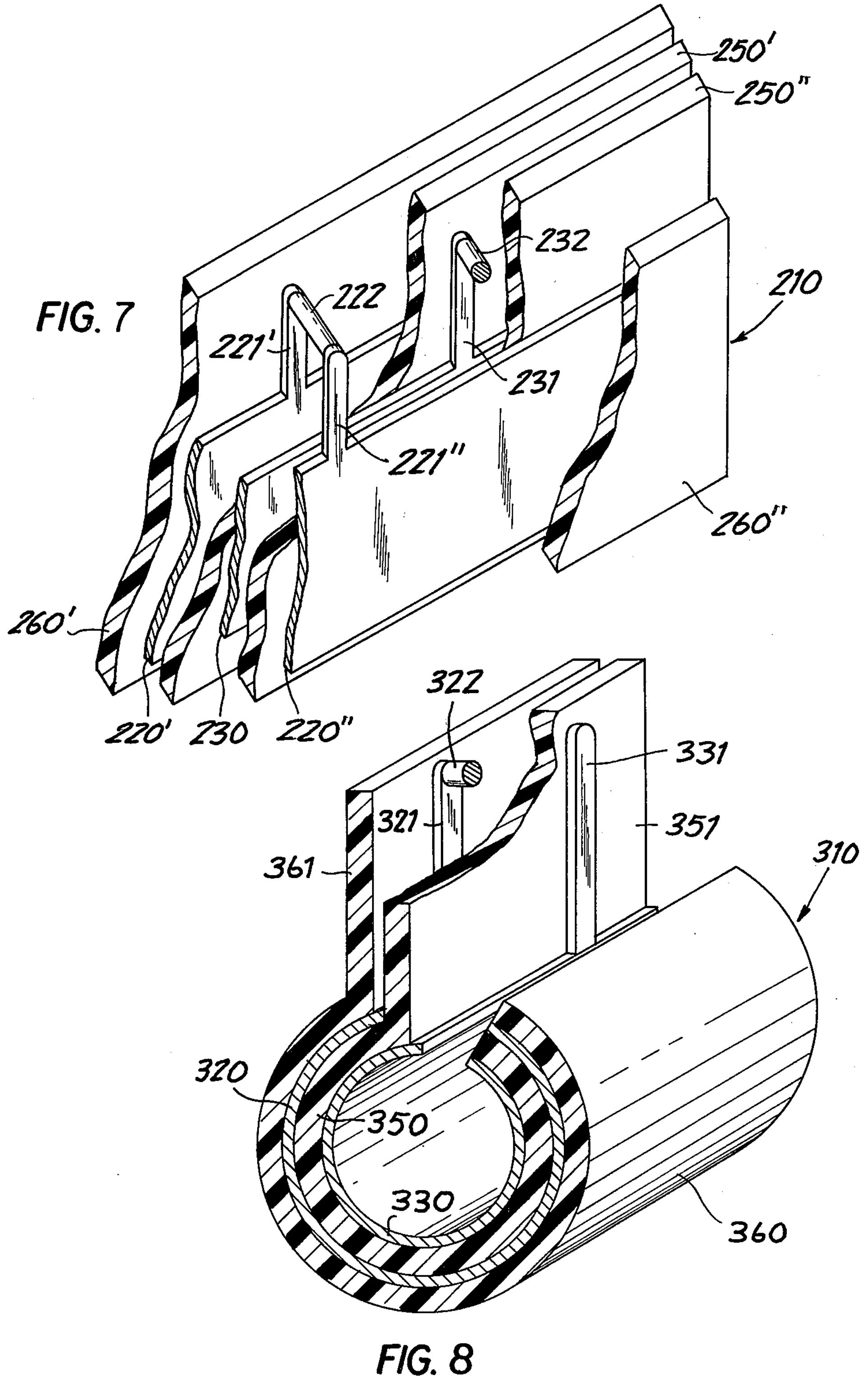
FIG. 7 is a perspective view of a portion of another transmission line according to my invention.
FIG. 8 is a view similar to FIG. 7, illustrating a modification.

In FIG. 7 I have shown a transmission line 210 according to the invention with an inner conductor 230 and two outer conductors 220', 220'' separated therefrom by insulating layers 250', 250'' of substantially nonpolarizable polymeric material. Two dielectric strips 260', 260'', not necessarily of the same material, form an outer shield for the assembly. The conductors 220', 220'', 230 may be thin copper foils, of a thickness not greater than δ, which advantageously are formed by printed-circuit technique directly on the adjoining dielectric layers.

The outer strips 220' and 220'' are integrally provided with tongues 221', 221'' bridged by conductive pegs 222 which also serve as connectors for joining them to corresponding leads of associated branch lines; the second lead of each branch line is connected to the inner conductor 230 via a tongue 231 integral therewith and a peg 232 at the free end thereof. The external junctions provided by pegs 222 and 232 are sufficiently remote from the longitudinal foil edges, and thus from the main signal path, to minimize the effect of these branch points upon the continuity of the line; this makes it less important to use the loop arrangement of FIG. 5 although, of course, the same could also be advantageously employed with this type of transmission line.

In order to minimize the stray electromagnetic field at the longitudinal edges of the strip line, outer strips 220' and 220'' are made somewhat wider than inner strip 230.

The stack shown in FIG. 7 may be held together by adhesive bonding and/or by longitudinally spaced rivets passing through the dielectric layers at a sufficient distance from the conductor strips to avoid interference with signal transmission.

FIG. 8 shows a modified transmission line 310 in which foils 320 and 330 are curved about a common axis to constitute the inner and outer conductors of a coaxial line with substantially nonpolarizable insulation 350 and an outer dielectric sheath 360. Conductors 320 and 330 may again be printed or otherwise coated on the intervening dielectric layers 350 and 360, respectively, though they could also both be carried on opposite surfaces of layer 350 alone. Tongues 331 and 321 integral with foils 330 and 320, respectively, are supported by fins 351, 361 integral with layers 350 and 360, respectively, and extend radially outwardly for connection to the leads of one or more branch lines. Pegs 322 at the extremities of tongues 321 are lodged in the dielectric fin 351 at locations remote from the main transmission path represented by the coaxial line 330, i.e. from the longitudinal foil edges which define a narrow slot in the coaxial line.

The quasi-cylindrical shape of transmission line 310 may be maintained by longitudinally spaced clamps or straps.

Figure 9:
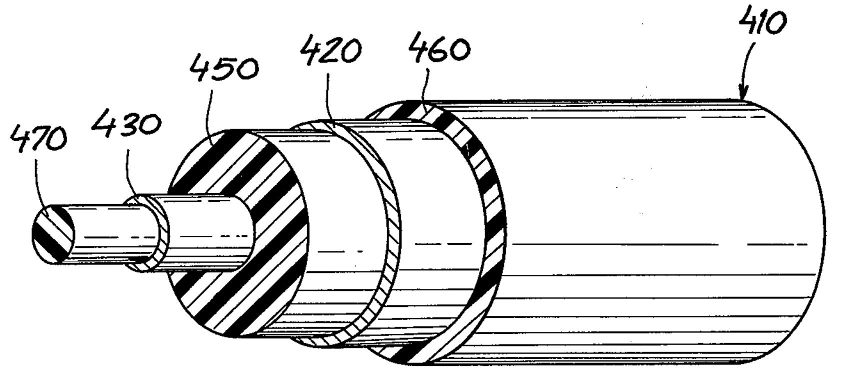
FIG. 9 is a further view similar to FIG. 5, showing still another transmission line according to my invention.

FIG. 9 shows a further embodiment of my invention in the form of a coaxial line 410 with an outer conductor 420, an inner conductor 430, an intervening insulating layer 450 of substantially nonpolarizable polymeric material, an outer dielectric sheath 460 and a dielectric inner core 470 which may or may not consist of the same material as layer 450. Conductors 430 and 420, which again should have a maximum thickness on the order of the penetration depth δ, may be copper strips wound about core 470 and layer 450, respectively. They could also be formed directly on these carriers or on opposite surfaces of layer 450, with omission of core 470, by vapor deposition or other coating processes. The thickness of the deposited coating can be increased, if necessary, by electroplating.

Figure 10:
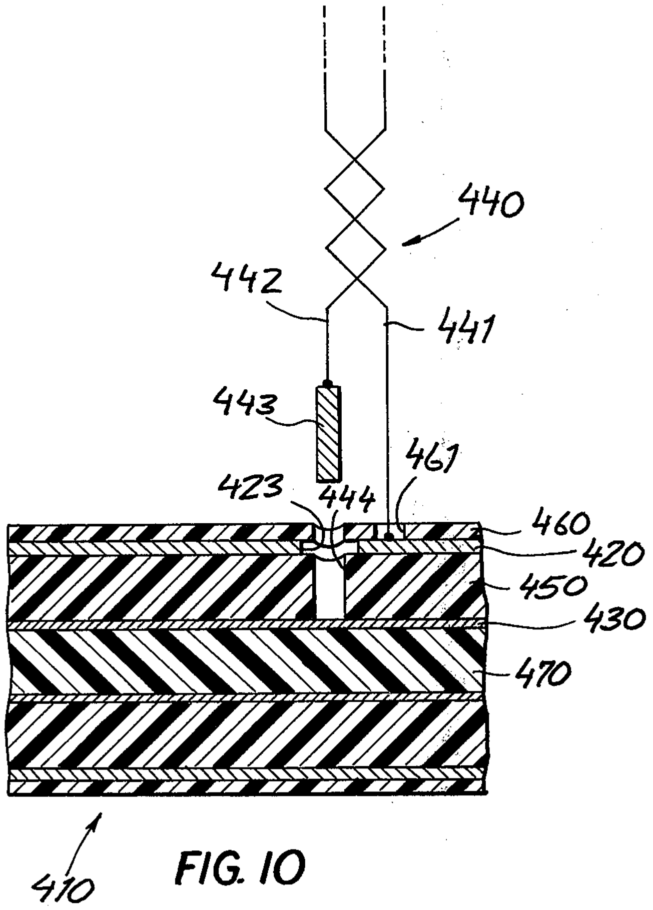
FIG. 10 is a fragmentary longitudinal sectional view of the transmission line of FIG. 9, illustrating a junction thereof with a branch line.

FIG. 10 illustrates the manner in which leads 441, 442 of a branch line 440 can be joined to the conductors 420 and 430, respectively, of transmission line 410. Lead 441 passes through an opening 461 of sheath 460 and is directly soldered onto the outer conductor 420. Lead 442 has a terminal 443 receivable as a plug in a bore 444 formed in dielectric layers 450 and 460; plus 443 is then soldered to the inner conductor 430, conductor 420 being cut away around the plug at 423 for a sufficient distance to prevent short-circuiting of the line. Core 470, carrying the inner conductor 430, should be inserted into the tubular layer 450 only after the bore 444 has been provided therein.

If the conductors 420 and 430 are formed as a coating on the tubular dielectric layer 450, e.g. by vapor deposition in vacuo, the bore 444 should be made before the coating process. The metal film will then also line the wall of the bore which therefore constitutes the area of contact between conductor 430 and plug 443.

The junction-forming technique shown in FIG. 10 involves only a very limited area of conductors 420 and 430 so as to minimize the effect of these discontinuities upon the quality of signal transmission.

I claim:

1. A transmission line for a time-division-multiplex communication system, comprising elongate first conductor means, elongate second conductor means spacedly juxtaposed with said first conductor means, and insulating means of a substantially nonpolarizable dielectric material, the effective thickness of said first and second conductor means in a common transverse plane being at most on the order of magnitude of the penetration depth of an alternating current at a frequency in the KHz range, said conductor means forming a closed loop with a multiplicity of junctions to respective branch lines at spaced-apart locations, said loop forming two parallel paths between any two of said junctions.

2. A transmission line as defined in claim 1 wherein said insulation means is a solid layer completely occupying the space between said first and second conductor means.

3. A transmission line for a time-division-multiplex communication system, comprising an elongate inner conductor, a tubular outer conductor coaxial with said inner conductor spacedly surrounding same, a solid insulating layer of a substantially nonpolarizable dielectric material completely occupying the space between said conductors, the effective thickness of said conductors in a common plane transverse to said layer being at most on the order of magnitude of the penetration depth of an alternating current at a frequency in the KHz range, said insulating layer being provided with a radial bore extending to said inner conductor, and a branch lead terminating in a plug seated in said bore in conductive contact with said inner conductor, said outer conductor being spaced from said plug.

4. A transmission line as defined in claim 3 wherein said effective thickness is less than 0.1 mm.

5. A transmission line as defined in claim 3 wherein said dielectric material is a polymer with a linear carbon chain.

6. A transmission line as defined in claim 5 wherein said polymer is polyethylene or polytetrafluoroethylene.

7. A transmission line as defined in claim 3 wherein said inner conductor forms a coating on said insulating layer extending over the peripheral wall of said bore.

* * * * *